July 11, 1961

E. I. WESTMORELAND 2,992,298

HYDRAULIC ESCAPEMENT MECHANISM

Filed June 18, 1959

INVENTOR.
EDWARD I. WESTMORELAND
BY
Max L. Libman

ATTORNEY

July 11, 1961

E. I. WESTMORELAND 2,992,298

HYDRAULIC ESCAPEMENT MECHANISM

Filed June 18, 1959

INVENTOR.
EDWARD I. WESTMORELAND
BY Max L. Libman
ATTORNEY

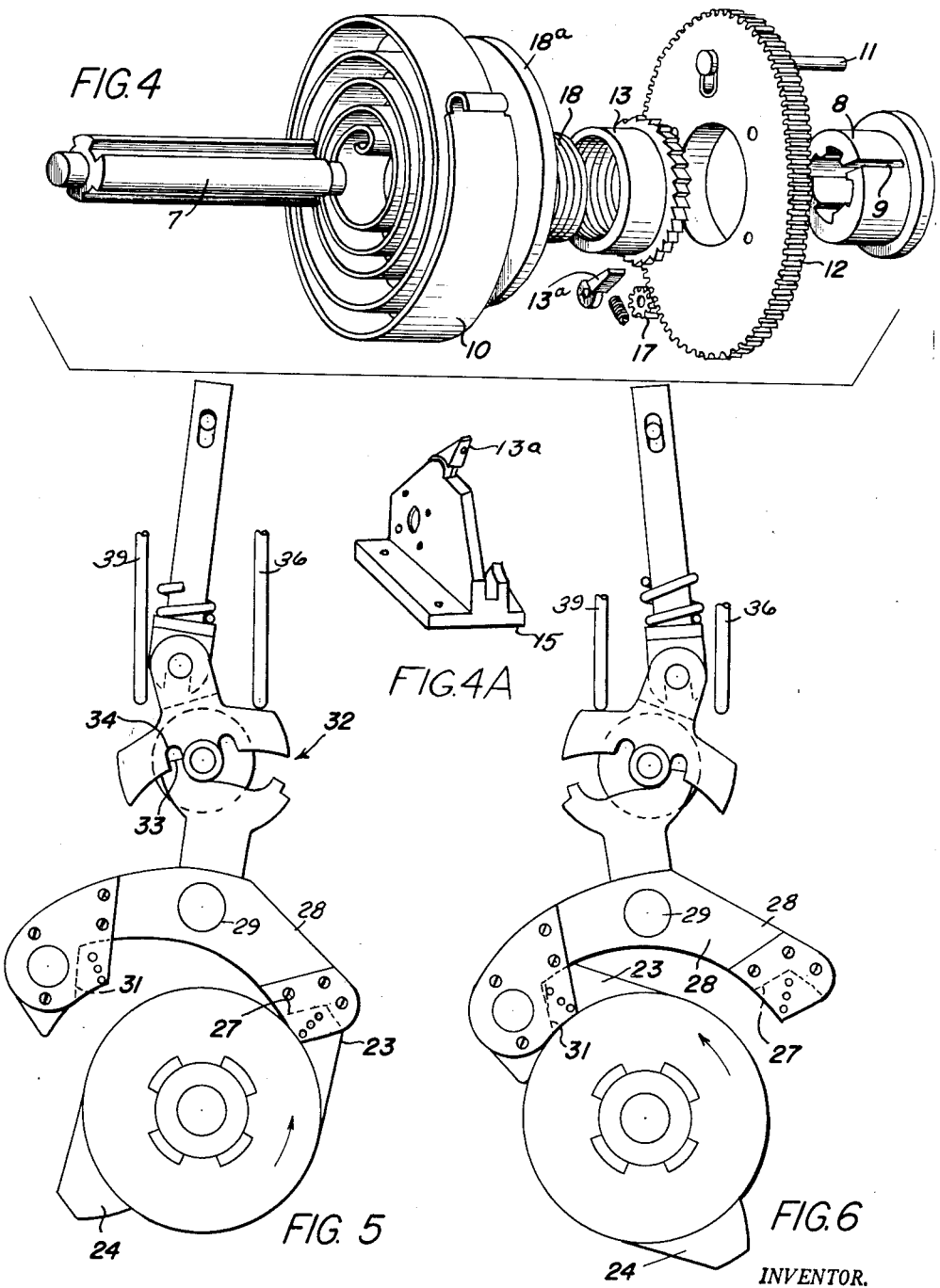

United States Patent Office 2,992,298
Patented July 11, 1961

2,992,298
HYDRAULIC ESCAPEMENT MECHANISM
Edward I. Westmoreland, 30 Newfield St.,
Plymouth, Mass.
Filed June 18, 1959, Ser. No. 821,291
11 Claims. (Cl. 200—33)

This invention relates to impact checking mechanisms and devices using such mechanisms, and more particularly to a device for intermittently checking and releasing rotational movement of a shaft which is under a more or less constant torque. This requirement is found in many applications, one, for example, being in high and low voltage automatically tripped switch gear which is usually placed in locations on a power line and is arranged to reset after a tripping operation due to abnormal load characteristics on that line. If the abnormal condition persists when the switch is reclosed, it trips again, and this operation is repeated for a number of times, after which the switch stays open if the abnormal condition still exists, until a maintenance crew clears the fault and makes possible resetting of the switch. Such equipment may operate at infrequent intervals—sometimes only once or twice a year, yet it must operate instantly and correctly to avoid damage to expensive equipment, despite its long disuse at a remote location with a minimum of attention and maintenance. Since it may be required to operate under conditions of power failure, this switch is powered by a heavy spring which is usually pre-wound by an electric motor which is arranged to shut off when the spring is at the proper operating stress. Since the stored energy or torque is necessarily fairly high to insure proper operation, yet the rotation must be stopped abruptly after a predetermined rotary travel of the device, there is a problem of absorbing the impact due to the sudden stoppage. Various types of shock absorbing devices and mechanisms have been proposed, but one of the most widely used at present is a very complex pneumatic system using compressed air as the energy storage means because of the difficulty heretofore encountered in satisfactorily absorbing the shock of the stopping impact of spring mechanisms without unduly wearing or damaging the equipment.

It is a major object of the invention to provide a simple, reliable and relatively inexpensive hydraulic mechanism for absorbing the impact shock of an intermittently actuated shaft operated by stored energy.

More specifically, it is an object of the invention to provide an improved switch gear actuating and resetting mechanism, and especially one having a spring load operated mechanism which is capable of a number of successive reclosures on one full spring charging.

In one embodiment of the invention, a heavy coil spring is wound up to drive a shaft, which may be connected to the switch gear (or any other suitable device) in any conventional manner. The entire mechanism is immersed in the oil in which the switch gear operates, and is therefore always protected from rust, corrosion, and sticking, and is always ready for operation. A simple lockout bar blocks the mechanism after a predetermined number of successive operations and at the same time opens the switch to the motor which normally winds the spring, so that the equipment may be put back into operation only by a deliberate reclosing of the motor cut-off switch, which causes a rewinding of the main spring and unblocks the mechanism from lock-out. A toggle close-trip latching assembly in the device provides a very desirable trip-free operation whereby if a fault remains on the system, the opening coil of the switch gear is actuated during any succeeding closing motion, so that the switch will immediately re-open and cannot remain closed while the fault is on the line due to a faulty trip latch that fails to release.

While the invention is exemplified in connection with a switch gear, it will be apparent that it is not restricted to this use, but that the mechanism is applicable to other uses where similar problems exist.

The specific nature of the invention, as well as other objects and advantages thereof, will clearly appear from a description of a preferred embodiment as shown in the accompanying drawings, in which:

FIG. 4 is an exploded view of the spring and drive shaft sub-assembly;

FIG. 4a is a perspective view of the motor mount, pawl and gear guide;

FIGS. 5 and 6 are escapement detail views showing the respective extreme positions of the escapement and operating toggle;

Figure 1:
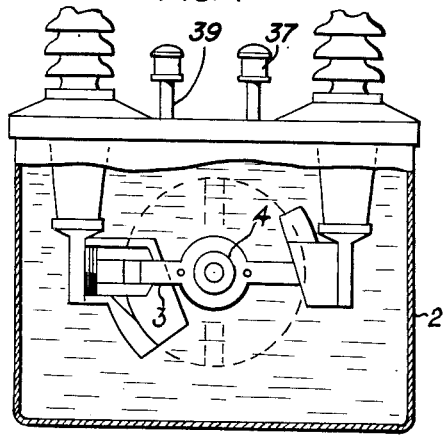
FIG. 1 is a schematic diagram of an oil circuit breaker, partly broken away, showing the application of the invention for operating same.
Figure 2:
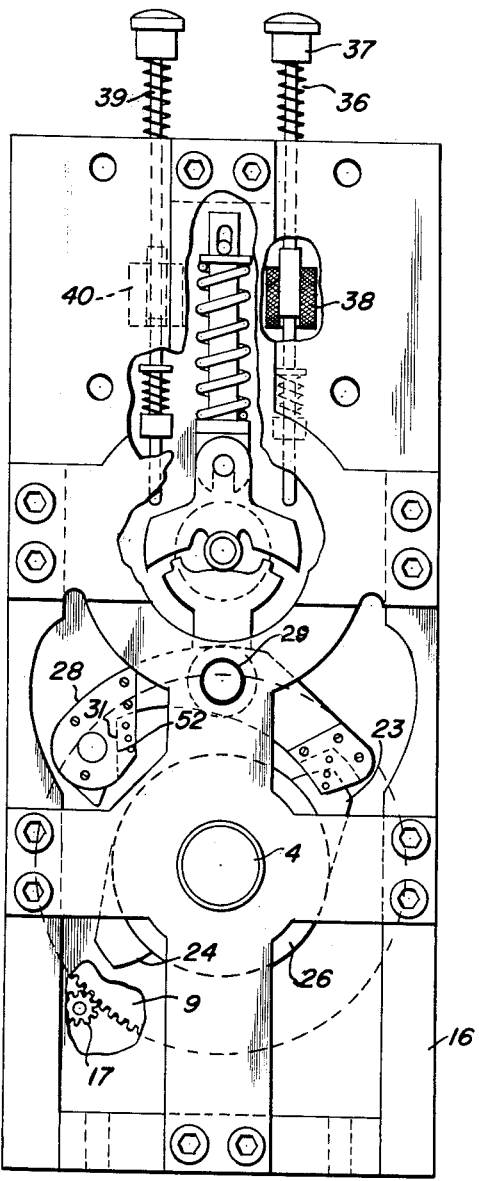
FIG. 2 is an end elevation of the escapement mechanism in the neutral or locked-out position.
Figure 3:
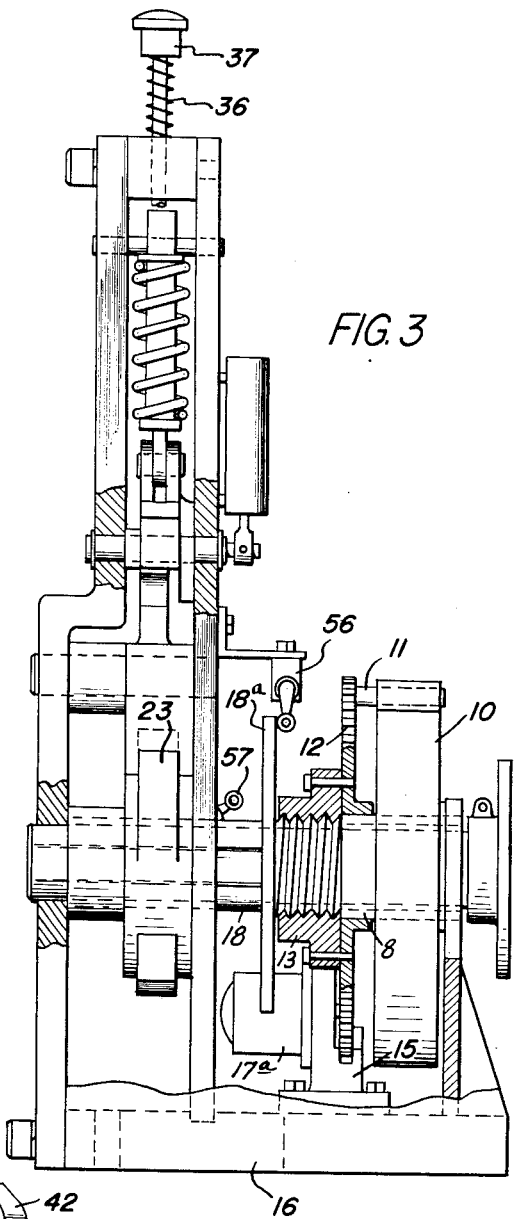
FIG. 3 is a side elevation of the escapement mechanism.

FIG. 1 shows a typical oil circuit breaker 2 with which the invention can be used. The switch blades 3 are shown in the closed position in solid lines. Upon 90° rotation of shaft 4 on which the blades are mounted, the switch assumes the open circuit position shown in dotted line. FIGS. 2 and 3 show the mechanism of the invention used to rotate shaft 4. The entire mechanism is mounted within the tank 2 of the oil switch below the oil level, at the end of shaft 4, as best seen in FIG. 3, with drive shaft 7 splined in a coupling attached to the end of shaft 4. Slidably mounted in splined relation on drive shaft 7 is a spline stub 8 having a spring slot 9 for retention of one end of a coil spring 10, the other end of which is fastened by means of a pin 11 to gear wheel 12 which is bolted or otherwise fixed to ratchet-and-nut member 13 so that 12 and 13 form a sub-assembly. A pawl 13a is pivoted on motor mount 15 (see FIG. 4a), which is mounted on the frame 16 and is spring-biased toward the ratchet 13 so that gear 12 can be driven in one direction only by drive gear 17 of electric motor 17a.

A spline-screw 18 having a disc-like annular head 18a is mounted in splined relation on drive shaft 7, in threaded engagement with member 13. It will be apparent that as the gear 17 turns the gear wheel 12 to wind spring 10, spline-screw 18, which is held by its splined relation from rotating on shaft 7, will move axially along the shaft toward the spring; when the spring is fully wound, the disc 18a is in the position shown in FIG. 3, in which it opens switch 56, cutting off the motor 17a. On the other hand, when the drive shaft 7 is rotating, as will be described later, the spline screw is thereby unscrewed from the nut 13, and moves along the shaft 7 away from the spring 10, for a purpose which will be described later.

It will be noted that since pawl 13a prevent ratchet 13 (and hence gear 12) from rotating in a direction to unwind the spring 10, the spring continues to exert a torque on shaft 7 after the motor 17a is cut off. However, spline stub 8 is normally prevented from rotating under the spring charge by the action of the hydraulic escapement drive cams 23, 24 which are mounted on cam wheel 26 splined to drive shaft 7; thus the cam wheel 26 rotates with the drive shaft, although the latter can slide axially with respect to the cam wheel.

The drive cam is shown in FIG. 5 restrained by stop surface 27 of escapement 28 which is pivotally mounted at 29 for limited rocking action so that either stop surface 27 or stop surface 31 is always in the path of one of the cams 23, 24. When the escapement is rocked from the position shown in FIG. 5, cam 23 is released for 90° rotation, and is then stopped by stop surface 31, which is down when stop surface 27 is up as shown in FIG. 6.

A toggle mechanism 32 normally keeps the escapement in one or the other of its extreme rocking positions, as will be apparent from the drawings. In the position shown in FIG. 5, corresponding to the open circuit position of the switch, the ear 33 is engaged in recess 34 of the toggle mechanism, which prevents the escapement from rocking to its opposite position, although it is being biased toward the opposite position because of the torque on cam wheel 26, through the sloping face of cam 23, which tends to push the stop surface 27 upward and out of the way. The toggle 32 can be rocked into the position shown in FIG. 6 by downward pressure on pin 36, which can be operated either manually by means of push-button 37 or electrically by means of solenoid 38, as is customary for such switch gear, to close the circuit breaker. A similar push pin 39 is provided for opening the circuit breaker. These push pins may be arranged to protrude through the top of the oil switch casing, if desired. When pin 36 is operated to flip the toggle, the ear 33 is first released, and the escapement first assumes the position shown in FIG. 2, while it is rocking from right to left, and then locks in the position shown in FIG. 6. From this position (FIG. 6) operation of pin 39 will, in a similar manner, restore the escapement to the position of FIG. 4, except that cams 23 and 24 will now be reversed, as the shaft 4 has rotated through 180°.

Due to the fact that the switch mechanism is fairly heavy, yet must be operated within as short a time as possible, usually in the order of 1/10 second, a very heavy coil spring 10 must be employed. Due to the inertia of all of these parts under the action of the powerful spring, the shock of stopping suddenly which occurs when the cams 23, 24 are engaged by the escapement, imposes a great strain on the mechanism and tends to quickly wear out and break down the mechanism. A simple and highly effective shock absorber is therefore incorporated into the mechanism, which is an important feature of the invention, and will now be described.

Figures 7, 8:
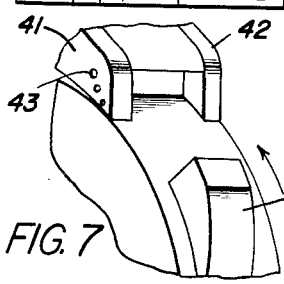
FIGS. 7 and 8 are perspective detail views showing the operation of the hydraulic shock absorbing mechanism.

Considering first the stop surface 27 of escapement 28, two plates 41, 42 are fastened to the end sides of the escapement lever 28 so as to form with the stop surface 27 a pocket for receiving cam 23 or 24 (see FIGS. 6 and 7). As this pocket is full of the oil in which the entire mechanism is immersed, it will be seen that the oil tends to be trapped in the pocket by the approaching cam. One or more small holes 43 are drilled in at least one of the plates to control the buffing or shock absorbing action, as best shown in FIG. 7, whereby the deceleration curve of the cam assembly can be controlled as desired. By this simple means, instead of a sudden jarring shock, a smooth deceleration is obtained at each operation which greatly extends the life of the apparatus, and makes the entire device practicable.

In the usual operation of such switch gear in remote locations on a power line, a fault on the line will actuate the tripping solenoid 40 to open the switch, and after a suitable interval determined by the line restoring system, the switch closing solenoid 38 is energized to re-close the breaker. If the fault is still on the line, it will immediately open again, and this operation may be repeated for a number of times, e.g., six times. The spring 10 must be sufficiently powerful to operate the mechanism for the entire six times. If the fault still persists during the sixth time, means must be provided to leave the switch in the open position until it is manually reset by the maintenance men who clear the fault. The means for accomplishing this will now be described.

Figure 9:
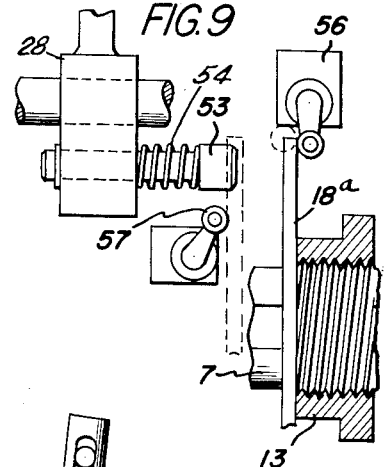
FIG. 9 is a detail view of the lock out and motor switch control mechanism.

As previously explained, when shaft 7 turns (which occurs during the above-described operation of the mechanism), the disc 18a moves away from the spring 10 and toward the cam. After the above-described series of operations, the disc will have moved close enough to the cam so that it now lies under a pin 53 loosely mounted in the end of escapement 28 near stop face 31. Pin 53 is urged outwardly by spring 54 as best shown in FIG. 9. The parts are so dimensioned that on the last, e.g., the sixth operation of the switch, the above action occurs and the disc 18a now prevents the escapement from moving down to its extreme closing position of FIG. 6, and holds it in the position shown in FIG. 6. At the same time, the disc 18a in its locking position, opens motor switch 57, the arrangement being such that when the disc is in its other extreme position, in which the spring is fully wound, the motor is also turned off, as previously described. Thus the oil switch is finally left in the open position and the re-closing mechanism is immobilized until the fault has been cleared. Note that the motor runs to wind up the spring at all intermediate positions. In case of a single switch operation, the motor re-winds as previously explained so that normally after each switch operation, the mechanism is restored to the fully wound position.

Figure 10:
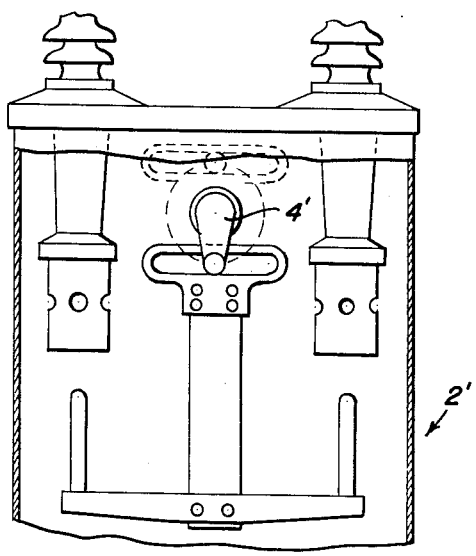
FIG. 10 is a view similar to FIG. 1 of a different type of oil circuit breaker with linear instead of rotary switch blade actuation.
Figure 12:
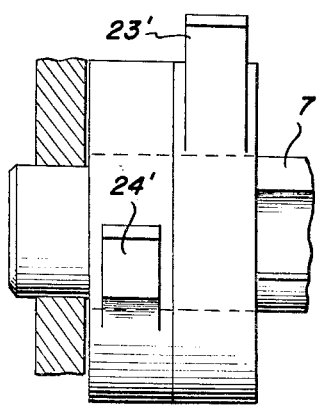
FIGS. 11 and 12 are detail views of a modified escapement mechanism using roller stop members.
Figure 11:
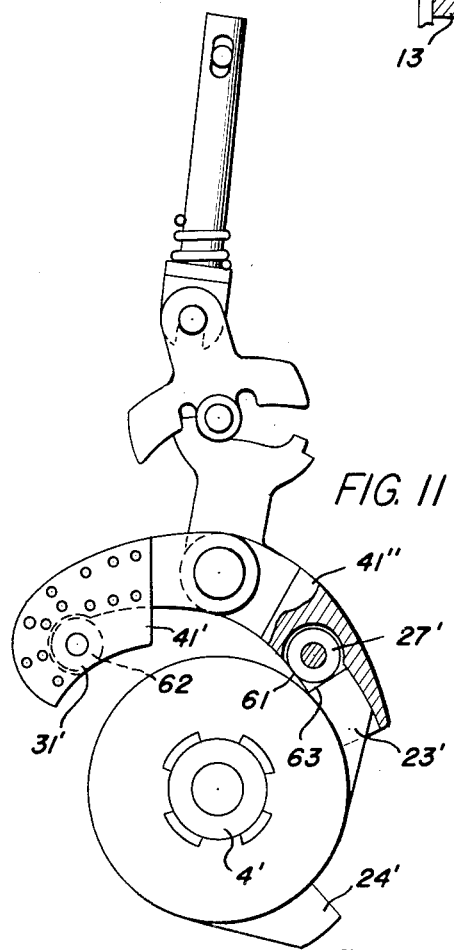

FIG. 10 shows another common type of circuit breaker with which the invention may be used. In this case, the circuit breaker 2' reciprocates between its open and its closed positions; it is therefore necessary for the shaft 4' (corresponding to the shaft 4 in FIG. 1) to rotate 180° instead of 90° as in FIG. 1. A modified escapement mechanism for doing this is shown in FIGS. 11 and 12. The toggle mechanism 32' is essentially the same as toggle 32 in the preceding figures, but the cam wheel 26' is made axially thicker than before and the cam teeth 23' and 24' are offset axially with respect to each other so that cam tooth 23' engages only one cam stop 27' of the escapement while the other cam tooth 24' engages only the other cam stop 31'. The cam teeth are displaced 90° apart on the cam wheel instead of 180° as before. It will be apparent that this configuration will give 180° rotation of the shaft for each operation of the toggle, thus meeting the requirement for FIG. 10.

Another improvement is shown in FIG. 11, in that rollers 61 and 62 are used instead of stop faces 23 and 31. These rollers provide smoother action, reduce friction, and are less subject to wear, since they constantly present a different portion of their surfaces to the cam teeth. Their use is made feasible by the hydraulic shock-absorbing action of the oil pockets formed as before. The engaging faces of the cam teeth (e.g., face 63 of tooth 23') are made with a slight slope with respect to the radius, which may be approximately 6°, in order to provide the needed upward component of force to lift the escapement lever when the toggle is operated and the escapement released. It will be understood that this roller operation is also applicable to the construction of FIGS. 2–4, but it is especially suited for heavy duty construction. Each escapement-end is provided with side plates as before in order to furnish the necessary pockets for absorbing the impact shock, as shown at 41' and 41" in FIG. 11.

In the switch gear operation shown, the motor limit switches are in series, so that the motor circuit is open if either switch 56 or switch 57 is open, and is closed only when the spring is not fully wound and the lock-out mechanism has not operated, i.e., after the sixth immediately consecutive attempt at closing operation of the oil switch.

The trip open and trip close solenoids and auxiliary switches are conventional oil switches, and may be used in any known type of automatic reclosing circuit breaker system, the details of such a system being conventional and not a part of the present invention.

It will be apparent that while the mechanism shown is particularly adaptable for use with an oil switch, it is also adaptable to other uses requiring a fast operation of equipment which can be actuated by a rotary shaft, such as emergency valve operation, etc. It is particularly useful for stand-by equipment which operates very infrequently, but which must be able to operate reliably after long periods of disuse.

It will be apparent that the embodiments shown are only exemplary and that various modifications can be made in construction and arrangement within the scope of my invention as defined in the appended claims.

I claim:

1. An escapement mechanism comprising a shaft, means for applying rotational torque to said shaft, a cam wheel fixed to said shaft, at least one cam tooth on said cam wheel, an escapement lever mounted for rocking motion, said lever having two stop faces adjacent its respective ends arranged so that in one rocking position of the lever one of said stop faces is in the path of a cam tooth as said cam wheel rotates and in the opposite rocking position of said lever the other stop face is in the path of a cam tooth, said escapement mechanism being immersed in a fluid, and walls on said lever forming with said stop faces respective pockets shaped to snugly fit said cam tooth in the engaged position of each respective stop face with a cam tooth as said tooth approaches a stop face and to releasably entrain a quantity of said fluid whereby to reduce the shock of engagement of said cam tooth with said cam face.

2. The invention according to claim 1, and limited fluid outlet means formed in said pocket to release entrained fluid under pressure from said pocket at a predetermined rate.

3. The invention according to claim 1, and a toggle mechanism for retaining said escapement lever in one or the other of said extreme positions.

4. The invention according to claim 3, said toggle mechanism operable between two alternately stable extreme positions, and latch means operative in each said extreme position of said toggle mechanism to latch said escapement lever in a position corresponding one of its extreme positions, and toggle stop surfaces on said latch means preventing rocking motion of said lever in an intermediate position of said toggle.

5. The invention according to claim 3, and lockout means for said escapement lever, said lockout means comprising means movable into the rocking path of said lever at an intermediate position thereof to prevent said lever from reaching an extreme position thereof, whereby said toggle stop surfaces are effective to prevent rocking motion of said escapement lever.

6. The invention according to claim 5, and an oil circuit breaker comprising an oil-filled tank and a heavy-duty switch immersed in said tank, switch operating mechanism for said switch driven by said shaft so that each successive rocking movement of said escapement lever causes an operation of said switch, said escapement mechanism being immersed in the oil of said tank.

7. The invention according to claim 6, and electrically controlled trip means for operating said toggle from one of its extreme positions to the other to thereby operate said oil switch.

8. The invention according to claim 7, and spring means windable to apply said rotative torque to said shaft, and ratchet-pawl means for retaining said spring means in the wound position.

9. The invention according to claim 8, and lockout control means operative upon unwinding motion of said spring means to move said lockout means toward its lockout position and operative upon winding motion of said spring to move said lockout means away from its lockout position.

10. The invention according to claim 9, comprising rotatable spring-winding means for winding said spring, a first screw-means splined to said shaft for rotation therewith and movable axially therealong, and a second screw-means in threaded relation to said first screw-means and rotatable with said rotatable spring-winding means, said lockout means being driven by said first screw-means into lockout position.

11. Rotary motion control mechanism comprising a rotatable shaft, operating mechanism attached to said shaft for operation by rotation of said shaft through a predetermined angle, means for applying rotary torque to said shaft to rapidly move it through the major portion of said predetermined angle, a stop member, a rotatable member fixed to said shaft for rotation therewith, and hydraulic shock absorber means effective to smoothly absorb the shock of rapidly stopping the motion of said shaft and operating mechanism at the end of said predetermined angle, said shock absorber means comprising fluid containing means, an open cup member and a coacting piston member immersed in said fluid containing means, one of said members being mounted on said stop member and the other of said members being mounted on said rotatable member so that said piston member engages said cup member in shock absorbing relationship at the end portion of said predetermined angle of rotation of the shaft, and means for moving said stop member away from said rotatable member to disengage said cup and piston members and to permit further rotation of said shaft.

References Cited in the file of this patent
UNITED STATES PATENTS

| | | |
|---|---|---|
| 1,023,879 | Royce | Apr. 23, 1912 |
| 1,195,526 | Steen | Aug. 22, 1916 |
| 1,491,244 | Palmer | Apr. 22, 1924 |
| 1,977,333 | Wunsche | Oct. 16, 1934 |
| 2,530,961 | Hansen | Nov. 21, 1950 |
| 2,674,890 | Mosset | Apr. 13, 1954 |
| 2,878,333 | McCarty et al. | Mar. 17, 1959 |